United States Patent
Eswaran et al.

(10) Patent No.: US 8,528,409 B2
(45) Date of Patent: Sep. 10, 2013

(54) HIGH TEMPERATURE GAGE PRESSURE SENSOR

(75) Inventors: Sivaprakash Eswaran, Karnataka (IN); Michael Moran, Plain City, OH (US)

(73) Assignee: Honeywell International Inc., Morristown, NJ (US)

( * ) Notice: Subject to any disclaimer, the term of this patent is extended or adjusted under 35 U.S.C. 154(b) by 217 days.

(21) Appl. No.: 13/206,428

(22) Filed: Aug. 9, 2011

(65) Prior Publication Data
US 2013/0036825 A1  Feb. 14, 2013

(51) Int. Cl.
*G01L 9/00* (2006.01)
(52) U.S. Cl.
USPC ............................. 73/700; 73/714; 73/729.1
(58) Field of Classification Search
USPC ..................................... 73/700–756
See application file for complete search history.

(56) References Cited

U.S. PATENT DOCUMENTS

| | | | |
|---|---|---|---|
| 4,283,954 A | | 8/1981 | Echtler et al. |
| 4,586,383 A | * | 5/1986 | Blomquist ................ 73/706 |
| 4,763,527 A | * | 8/1988 | Raftis ..................... 73/730 |
| 5,213,726 A | * | 5/1993 | Ramsey et al. .......... 264/40.5 |
| 7,387,028 B1 | | 6/2008 | Carver et al. |
| 7,775,119 B1 | | 8/2010 | Suminto et al. |
| 2008/0141780 A1 | * | 6/2008 | Wavering et al. ............. 73/723 |
| 2009/0288493 A1 | * | 11/2009 | Larson et al. ............... 73/729.1 |
| 2010/0281994 A1 | * | 11/2010 | Brown et al. ............... 73/729.1 |

FOREIGN PATENT DOCUMENTS

JP  63003234 A  1/1988
JP  2007271280 A  10/2007

OTHER PUBLICATIONS

Daytronic; Strain Gage Pressure Transducers; Daytronic Corporatin—502A Series Precision Gage/Absolute Pressure Transducers; http://www.daytronic.com/products/trans/t-502APT.htm.
Ultra Precision Gage/Absolute Pressure Transducers Model Super TJE; www.sensotec.com.

* cited by examiner

*Primary Examiner* — Andre Allen
(74) *Attorney, Agent, or Firm* — Ingrassia Fisher & Lorenz, P.C.

(57) ABSTRACT

A pressure sensor for measuring gage pressure in relatively high temperature environments is provided. The sensor includes a housing that is configured to couple to a source of pressurized fluid and has an inner surface that defines a inner volume. A pressure sensitive device is coupled to the sensor housing and is configured define a reference chamber in at least a portion of the inner volume. The reference chamber is fluidly isolated from the source of pressurized fluid. An atmospheric reference port is formed in the sensor housing and is in fluid communication with the reference chamber for maintaining the reference chamber at ambient atmospheric pressure. A porous metallic plug is disposed within the atmospheric reference pressure port.

17 Claims, 3 Drawing Sheets

HIGH TEMPERATURE GAGE PRESSURE SENSOR

TECHNICAL FIELD

The present invention generally relates to pressure sensors, and more particularly relates to a pressure sensor for sensing gage pressure in high temperature environments.

BACKGROUND

Pressure sensors are used to sense the pressure of various fluids (both liquid and gas) in various environments. The particular type of pressure sensor that is used in a particular application may depend, at least in part, on the type of pressure measurement being sense: absolute pressure, gage pressure, or differential pressure. Absolute pressure is pressure that is sensed relative to a vacuum, gage pressure is pressure sensed relative to ambient atmospheric pressure, and differential pressure is the pressure difference sensed between two different pressure sources.

As may be appreciated, when gage pressure is being sensed, a portion of the pressure sensor is exposed to the ambient atmospheric pressure of the environment in which it is installed. This is typically facilitated by forming a vent hole or passage in an appropriate portion of the sensor housing. To prevent accumulation of dust or other debris within the sensor housing, the vent hole or passage may include a sufficiently porous plug or filter. Presently known plugs and filters cannot, however, withstand many relatively high temperature and/or radiation environments. As a result, many presently known gage pressure sensors may not be suitable for use in such environments.

Hence, there is a need for a gage pressure sensor that can be used in relatively high temperature and/or high radiation environments. The present invention addresses at least this need.

BRIEF SUMMARY

In one embodiment, a pressure sensor for measuring gage pressure in relatively high temperature environments includes a sensor housing, a pressure sensitive device, an atmospheric reference port, and a porous metallic plug. The sensor housing is configured to couple to a source of pressurized fluid, and has an inner surface that defines a inner volume. The pressure sensitive device is coupled to the sensor housing and is configured to define a reference chamber in at least a portion of the inner volume. The reference chamber is fluidly isolated from the source of pressurized fluid. The atmospheric reference port is formed in the sensor housing and is in fluid communication with the reference chamber for maintaining the reference chamber at ambient atmospheric pressure. The porous metallic plug disposed within the atmospheric reference port.

In another embodiment, a pressure sensor for measuring gage pressure in relatively high temperature environments includes a sensor housing, a pressure sensitive device, an atmospheric reference port, and a fiber metal felt plug. The sensor housing is configured to couple to a source of pressurized fluid, and has an inner surface that defines a inner volume. The pressure sensitive device is coupled to the sensor housing and is configured to define a reference chamber in at least a portion of the inner volume. The reference chamber is fluidly isolated from the source of pressurized fluid. The atmospheric reference port is formed in the sensor housing and is in fluid communication with the reference chamber for maintaining the reference chamber at ambient atmospheric pressure. The fiber metal felt plug is disposed within the atmospheric reference port.

In yet another embodiment, a pressure sensor for measuring gage pressure in relatively high temperature environments includes a sensor housing, a pressure diaphragm, an atmospheric reference port, a fiber metal felt plug, and a spring clip. The sensor housing is configured to couple to a source of pressurized fluid, and has an inner surface that defines a inner volume. The pressure diaphragm is coupled to the sensor housing and is configured to define a reference chamber in at least a portion of the inner volume. Te reference chamber is fluidly isolated from the source of pressurized fluid. The atmospheric reference port is formed in the sensor housing and is in fluid communication with the reference chamber for maintaining the reference chamber at ambient atmospheric pressure. The fiber metal felt plug is disposed within the atmospheric reference port. The spring clip is disposed at least partially within the atmospheric reference port and retains the fiber metal felt plug therein.

Furthermore, other desirable features and characteristics of the pressure sensor will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Furthermore, there is no intention to be bound by any expressed or implied theory presented in the preceding technical field, background, brief summary, or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Figure 1:
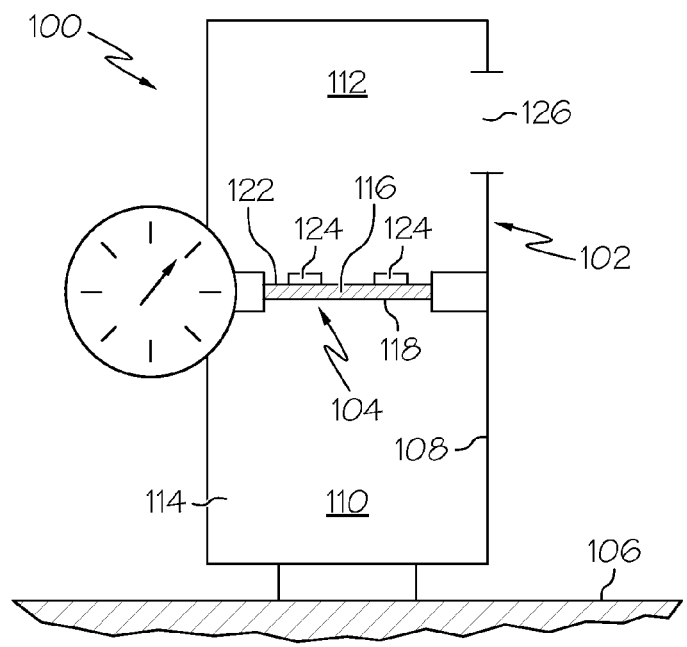
FIG. 1 depicts a schematic representation of a gage pressure sensor.
Figure 2:
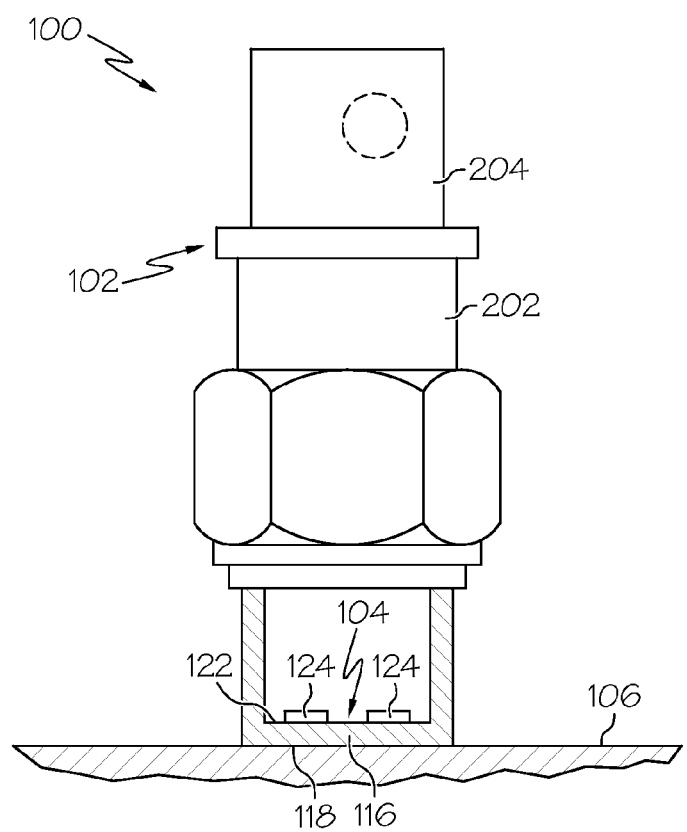
FIG. 2 depicts a simplified cross section view of one example of an embodiment of a gage pressure sensor.

Referring first to FIG. 1, a schematic representation of a gage pressure sensor 100 is depicted and includes a sensor housing 102 and a pressure sensitive device 104. The sensor housing 102 is configured to couple to a source of pressurized fluid 106 and includes an inner surface 108 that defines an inner volume 110. It will be appreciated that the sensor housing 102 may be variously implemented. One particular implementation is depicted in FIG. 2 and includes a main housing section 202 and a connector section 204. The main housing section 202 has the pressure sensitive device 104 coupled thereto and is configured to couple to the source of pressurized fluid 106. The connector section 204 is coupled to the main housing section 202 and is configured to electrically interconnect the pressure sensitive device 104 with external, non-illustrated equipment.

Returning again to FIG. 1, the pressure sensitive device 104 is coupled to the sensor housing 102 and is configured to define at least a reference chamber 112 in at least a portion of the inner volume 110. In the embodiment depicted in FIG. 1, the pressure sensitive device 104 is coupled to the sensor housing 102 such that it also defines a process fluid chamber 114 in the inner volume 110. It will be appreciated, however, that in other embodiments, such as the one depicted in FIG. 2, the pressure sensitive device 104 could be disposed directly adjacent the source of pressurized fluid 106, and thus not define a process fluid chamber 114.

The pressure sensitive device 104 may be variously configured and implemented. For example, it may be any one of numerous types of capacitive devices, resistive devices, piezoelectric devices, or semiconductor devices, just to name a few. In one particular embodiment, the pressure sensitive device 104 is implemented using a pressure sensitive diaphragm 116 that has a process fluid side 118 and a reference pressure side 122. The process fluid side 118 is in fluid communication with the source of pressurized fluid 106 and is fluidly isolated from the reference chamber 112. The reference pressure side 122 is disposed opposite the process fluid side 118 and is in fluid communication with the reference chamber 112. A plurality of strain gauges 124 are also disposed on the reference pressure side 122 of the diaphragm 116.

The reference chamber 112, as may be appreciated, is fluidly isolated from the source of pressurized fluid 106, and is maintained at ambient atmospheric pressure via an atmospheric reference port 126 that is formed in the sensor housing 102. The specific location of the atmospheric reference port 126 in the sensor housing 102 may vary and may depend, for example, on the configuration of the sensor housing 102. In the exemplary embodiment depicted in FIG. 2, in which the sensor housing 102 includes the main housing section 202 and the connector section 204, the atmospheric reference port 126 is formed in the connector section 204. An example of a physical implementation of a connector section 204 that may be used is depicted in FIGS. 3-5, and with reference thereto will now be described.

The depicted connector section 204 includes a flange portion 302, a connector portion 304, and a plurality of connector pins 306. The flange portion 302 includes a first side 308 and a second side 312. The first side 308 is configured to couple to the main housing section 202, and the second side 312 has the connector portion 304 extending therefrom. The connector portion 304 surrounds each of the connector pins 306, which extend through the flange portion 302 between the first and second sides 308, 312.

Figure 3:
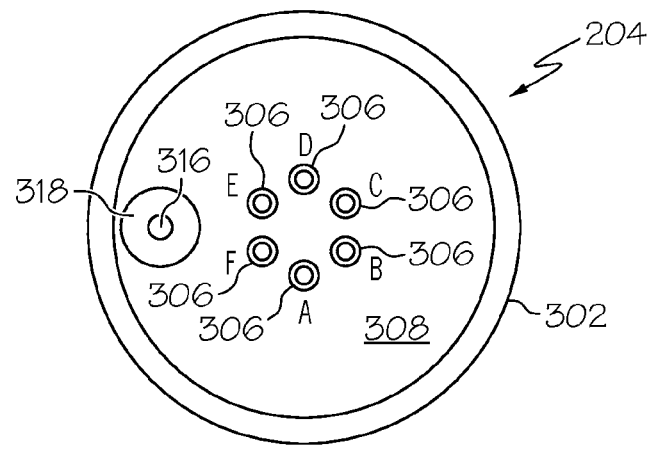
FIGS. 3-5 depict bottom, top, and cross section views, respectively, of a connector that may be used to implement the gage pressure sensor of FIG. 1.
Figure 4:
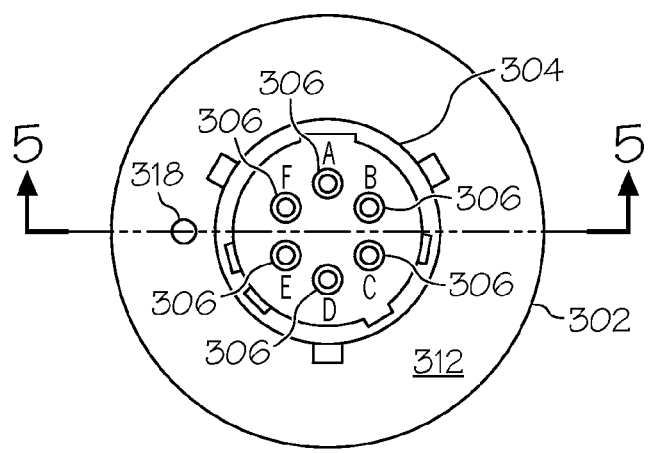
Figure 5:
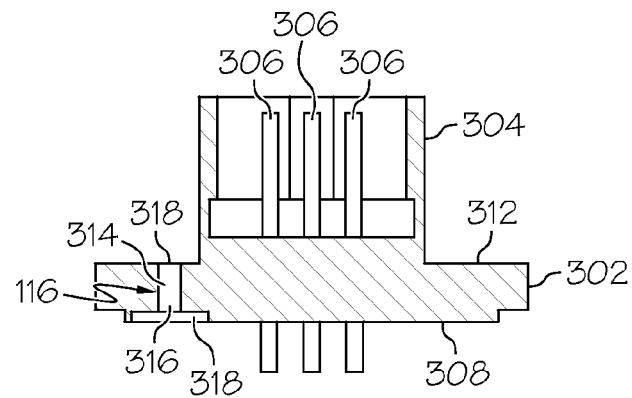
Figure 6:
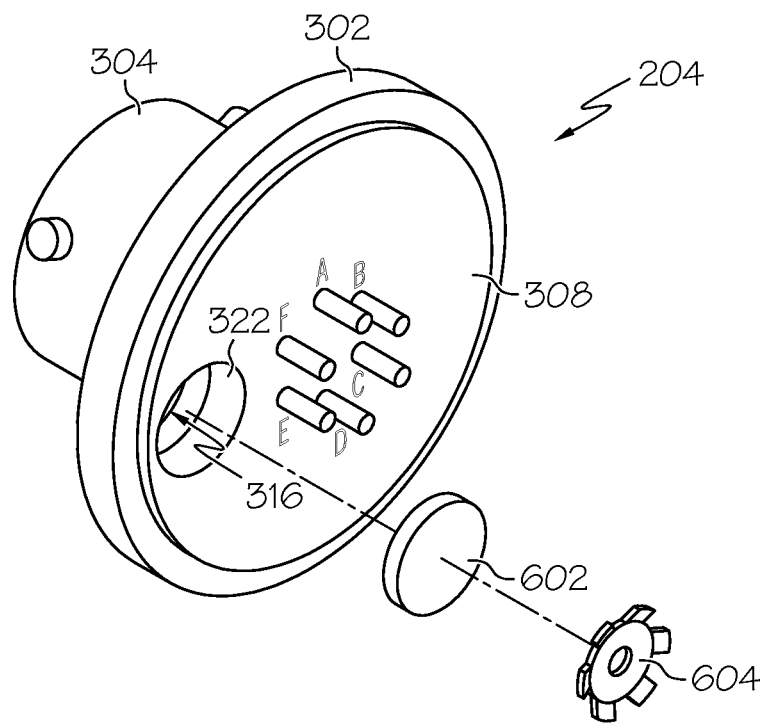
FIG. 6 depicts a perspective view of the exemplary connector depicted in FIGS. 3-5 together with a porous metal plug and retainer.

As FIGS. 3-5 also depicts, the flange portion 302 has the reference pressure port 116 formed therein. In this embodiment, the reference pressure port 116 includes a channel 314 having a first port 316 and a second port 318, and that extends through the flange portion 302 between the first and second sides 308, 312. A recess 322 is formed in a portion of the flange first side 308, and surrounds the first port 316. As depicted most clearly in FIG. 6, the recess 322 is configured to have a porous metal plug 602 disposed therein. The porous metallic plug 602 prevents the ingress and accumulation of particulate and other debris in the reference chamber 112. The porous metallic plug 602 is held in place using a suitable retainer 604, such as the depicted retaining washer.

Figure 7:
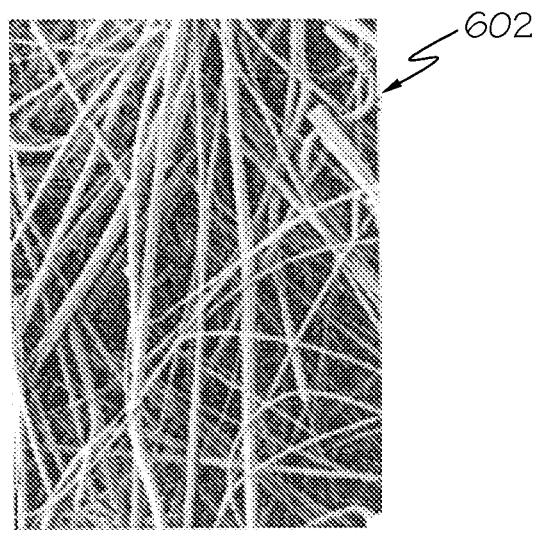
FIG. 7 depicts a close-up view of a portion of a porous metal fiber plug that may be used with the pressure sensor of FIG. 1 and the connector of FIG. 2.

The porous metallic plug 602 may be variously configured and implemented, but in the depicted embodiment it is implemented using a fiber metal felt material, and most preferably a non-woven fiber metal felt material that is constructed of stainless steel. A close-up view of one example of a stainless steel non-woven fiber metal felt is depicted in FIG. 7, and is sold by Purolator Engineered Filtration Products. The porous metallic plug 602 prevents the ingress and accumulation of dust and other debris in the reference chamber 112, while allowing the reference chamber 112 to remain at ambient atmospheric pressure. The porous metallic plug 602 will also retain its structural integrity when exposed to relatively high temperature and/or radiation environments, and thus allows the pressure sensor 100 to meet an Ingress Protection Rating of 65 (IP 65).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A pressure sensor for measuring gage pressure in relatively high temperature environments, comprising:
   a sensor housing configured to couple to a source of pressurized fluid, and having an inner surface that defines a inner volume;
   a pressure sensitive device coupled to the sensor housing and configured to define a reference chamber in at least a portion of the inner volume, the reference chamber fluidly isolated from the source of pressurized fluid;
   an atmospheric reference port formed in the sensor housing and in fluid communication with the reference chamber for maintaining the reference chamber at ambient atmospheric pressure; and
   a porous metallic plug disposed within the atmospheric reference port.

2. The pressure sensor of claim 1, further comprising:
   a spring clip disposed at least partially within the atmospheric reference port and retaining the porous metallic plug therein.

3. The pressure sensor of claim 1, wherein the porous metallic plug comprises stainless steel.

4. The pressure sensor of claim 1, wherein the porous metallic plug comprises a fiber metal felt.

5. The pressure sensor of claim 4, wherein the fiber metal felt comprises stainless steel.

6. The pressure sensor of claim 1, wherein the sensor housing comprises:
- a main housing section having the pressure sensitive device coupled thereto and configured to couple to the source of pressurized fluid; and
- a connector section coupled to the main housing section and having the atmospheric reference port formed therein, the connector section comprising a plurality of electrically conductive pins, each of the electrically conductive pins coupled to the pressure sensitive device.

7. The pressure sensor of claim 1, wherein the pressure sensitive device comprises:
- a diaphragm having a process fluid side and a reference pressure side, the process fluid side fluidly isolated from the reference chamber, the reference pressure side disposed opposite the process fluid side and in fluid communication with the reference chamber; and
- a plurality of strain gauges disposed on the reference pressure side of the diaphragm.

8. The pressure sensor of claim 7, wherein the diaphragm comprises a metal.

9. The pressure sensor of claim 1, wherein:
- the pressure sensitive device divides the inner volume into the reference chamber and a process media chamber, the reference chamber and the process media chamber fluidly isolated from each other; and
- the sensor housing additionally has a process media port formed therein, the process media port in fluid communication with the process media chamber and configured to couple to the source of process fluid.

10. A pressure sensor for measuring gage pressure in relatively high temperature environments, comprising:
- a sensor housing configured to couple to a source of pressurized fluid, and having an inner surface that defines a inner volume;
- a pressure sensitive device coupled to the sensor housing and configured to define a reference chamber in at least a portion of the inner volume, the reference chamber fluidly isolated from the source of pressurized fluid;
- an atmospheric reference port formed in the sensor housing and in fluid communication with the reference chamber for maintaining the reference chamber at ambient atmospheric pressure; and
- a fiber metal felt plug disposed within the atmospheric reference port.

11. The pressure sensor of claim 10, further comprising:
- a spring clip disposed at least partially within the atmospheric reference port and retaining the fiber metal felt plug therein.

12. The pressure sensor of claim 10, wherein the sensor housing comprises:
- a main housing section having the pressure sensitive device coupled thereto and configured to couple to the source of pressurized fluid; and
- a connector section coupled to the main housing section and having the atmospheric reference port formed therein, the connector section comprising a plurality of electrically conductive pins, each of the electrically conductive pins coupled to the pressure sensitive device.

13. The pressure sensor of claim 10, wherein the pressure sensitive device comprises:
- a diaphragm having a process fluid side and a reference pressure side, the process fluid side fluidly isolated from the reference chamber, the reference pressure side disposed opposite the process fluid side and in fluid communication with the reference chamber; and
- a plurality of strain gauges disposed on the reference pressure side of the diaphragm.

14. The pressure sensor of claim 13, wherein the diaphragm comprises a metal.

15. The pressure sensor of claim 10, wherein:
- the pressure sensitive device divides the inner volume into the reference chamber and a process media chamber, the reference chamber and the process media chamber fluidly isolated from each other; and
- the sensor housing additionally has a process media port formed therein, the process media port in fluid communication with the process media chamber and configured to couple to the source of process fluid.

16. A pressure sensor for measuring gage pressure in relatively high temperature environments, comprising:
- a sensor housing configured to couple to a source of pressurized fluid, and having an inner surface that defines a inner volume;
- a pressure diaphragm coupled to the sensor housing and configured to define a reference chamber in at least a portion of the inner volume, the reference chamber fluidly isolated from the source of pressurized fluid;
- an atmospheric reference port formed in the sensor housing and in fluid communication with the reference chamber for maintaining the reference chamber at ambient atmospheric pressure;
- a fiber metal felt plug disposed within the atmospheric reference port; and
- a spring clip disposed at least partially within the atmospheric reference port and retaining the fiber metal felt plug therein.

17. The pressure sensor of claim 16, wherein the sensor housing comprises:
- a main housing section having the pressure sensitive device coupled thereto and configured to couple to the source of pressurized fluid; and
- a connector section coupled to the main housing section and having the atmospheric reference port formed therein, the connector section comprising a plurality of electrically conductive pins, each of the electrically conductive pins coupled to the pressure sensitive device.

\* \* \* \* \*